United States Patent Office 3,393,361
Patented July 16, 1968

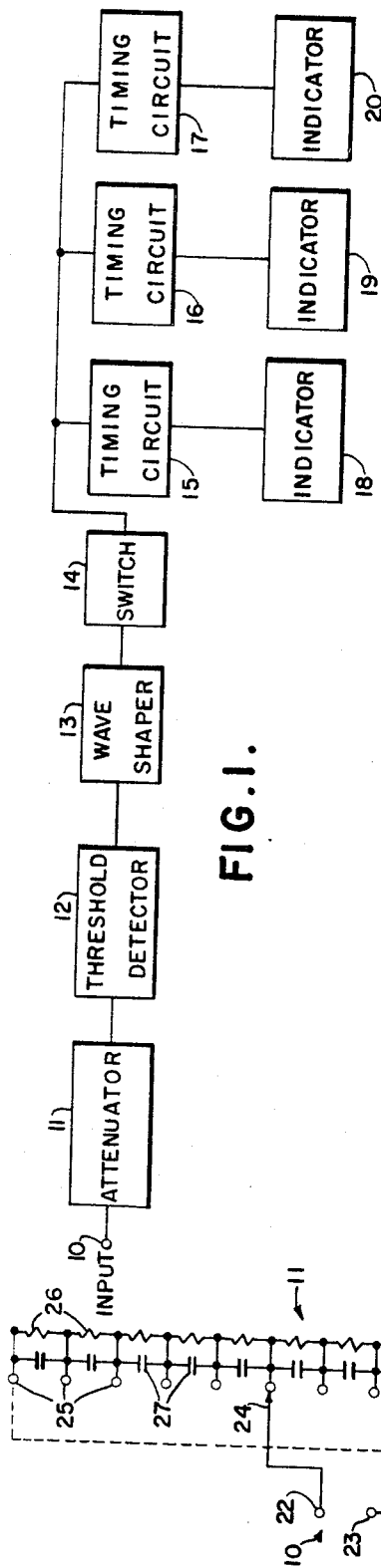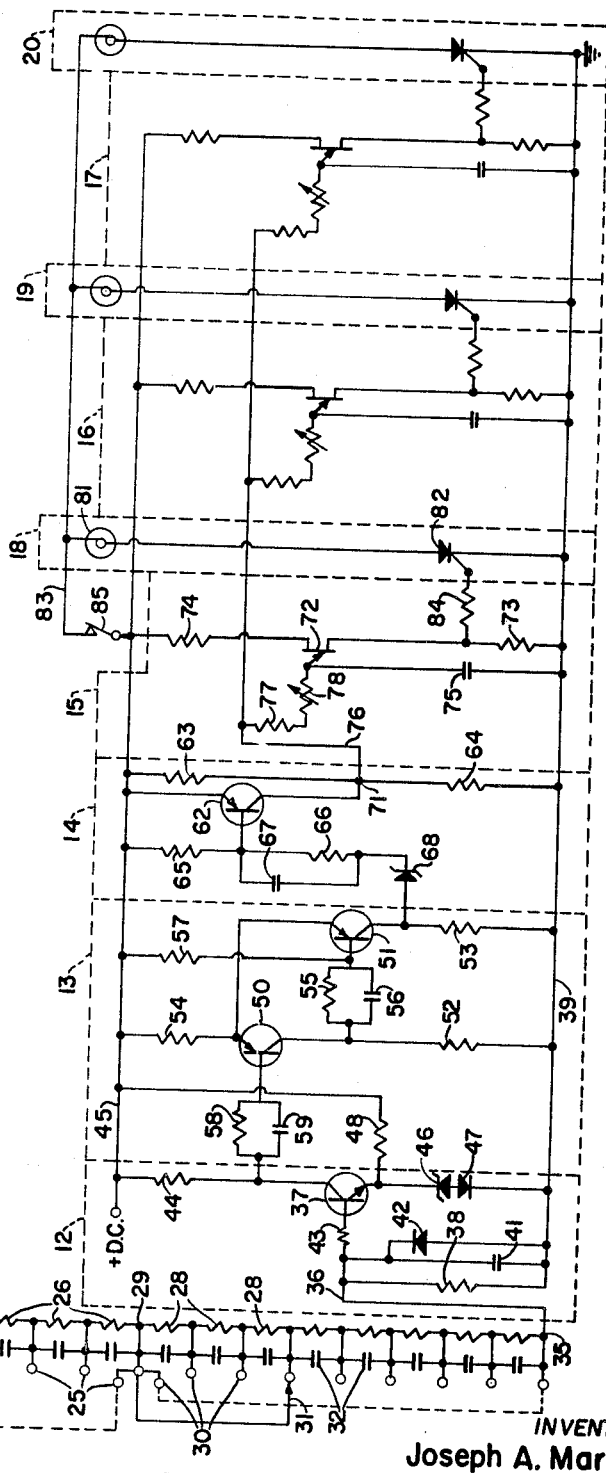

3,393,361
APPARATUS FOR MEASURING THE WIDTH OF TRANSIENT PULSES
Joseph Allen Martin, Dayton, Ohio, assignor to American Machine & Foundry Company, a corporation of New Jersey
Continuation of application Ser. No. 275,863, Apr. 26, 1963. This application Mar. 24, 1967, Ser. No. 625,881
7 Claims. (Cl. 324—68)

ABSTRACT OF THE DISCLOSURE

A device for measuring the duration of a transient signal, having circuit means for providing a formed wave which is sharply defined when the transient signal exceeds a predetermined threshold, and with solid state switch means activating a plurality of timing circuits each of having a different time cycle and indicating means for providing a readout of the measured signal duration.

---

This is a continuation of Ser. No. 275,863, filed Apr. 26, 1963, now abandoned.

This application relates to electrical measuring circuits and more specifically to circuits which are adapted to measure the width of transient pulses.

Instruments for determining the pulse width of recurrent pulses are well known. There is, however, a need, currently unfulfilled, for an accurate and reliable instrument for the measurement of the pulse width of non-recurrent, transient pulses. To be useful, such an instrument must be capable of remaining operative for an extended period of time during which no pulse appears at the input, and then providing an accurate indication of the width of a singly occurring pulse whose width may be as small as one microsecond.

It is accordingly an object of this invention to provide an instrument for measuring and indicating the width of non-recurrent transient pulses.

Pulses may be of various configurations. However, in general a pulse narrows somewhat from a broad and poorly defined base, which may be obscured by low level noise and the like. For this reason, pulse width is customarily defined as the width of the pulse at a particular level of pulse amplitude. This is some arbitrarily assigned reference or threshold level of voltage or current, with the particular threshold being determined by the shape of the expected pulses and by the other requirements of the system.

It is a further object of this invention to provide such an instrument in which the amplitude level at which the pulse width is measured is adjustable.

It is an additional object of this invention to provide such an instrument which is extremely versatile, being adapted to measure pulses exhibiting a wide range of amplitude and width.

These objectives are achieved in one embodiment of this invention by providing a level sensing circuit, a timing means and an indicating circuit. The level sensing circuit provides a signal which initiates the operation of the timing means when the input signal exceeds the threshold level, and provides a second signal for terminating the operation of the timing means when the input signal recrosses the threshold. The indicating circuit is connected to the output of the timing means and is adapted to provide a visual indication or the like of the length of time for which the timing means has been energized, thus providing an indication of the width of the input pulse at the reference level.

The timing means may comprise a plurality of timing circuits, each having a fixed timing cycle of a different length. All of the timing circuits are initiated into operation simultaneously by the level sensing circuit as soon as the input signal exceeds the threshold. They continue to run until turned off upon the recrossing of the threshold level by the input signal. Those timing circuits having timing cycles shorter than the pulse width will complete a timing cycle before being turned off; those having timing cycles longer than the pulse width will not.

A separate indicator corresponds to each timing circuit and is adapted to become and remain energized, providing, for instance, a visual indication, upon the completion of the timing cycle of its corresponding timing circuit. Each indicator thus corresponds to a timing cycle of a different length, and at the termination of the pulse (when the input signal recrosses the threshold), those indicators corresponding to timing cycles of lesser extent than a pulse width will be energized, and those indicators corresponding to timing cycles of greater extent than the pulse width will not be energized. Therefore, if the timing cycles are arranged at conveniently spaced time increments, the width of the transient pulse may be placed within a given range by noting the highest time value of indicator which is energized. For instance, if there are three indicators, corresponding to one, two and three microsecond time intervals, if the one and two microsecond indicators are energized and the three microsecond indicator is not energized, it is obvious that the transient pulse width was between two and three microseconds.

In the application, we are concerned, as discussed above, with a threshold level and with the determination of when a signal exceeds that threshold level. While the particular embodiment of this invention to be described below in detail is a voltage sensitive instrument arranged to measure positive-going pulses, the invention is not so restricted. Thus, either positive-going or negative-going pulses may be measured and consequently the phrase "exceeding the threshold level," except when used with reference to the specific illustrative embodiment, applies equally well to an instrument for measuring negative-going pulses, where the input signal exceeds the threshold in a negative direction. The threshold value may also be either a voltage or a current, depending upon which parameter of the input pulse is being measured; the inventive device is adaptable for measuring both.

The invention, and the manner in which it fulfills the above and other objectives, may be more clearly understood by reference to the follow detailed description taken in conjunction with the drawings, which form a part of the specification, and in which:

FIG. 1 is a block diagram of an embodiment of this invention for measuring the width of positive-going voltage pulses; and FIG. 2 is a detailed schematic diagram of the embodiment whose block diagram is shown in FIG. 1.

The overall operation of this embodiment of the invention may be understood most easily by referring to the block diagram of FIG. 1.

The line or circuit to be monitored is connected via input 10 to attenuator 11. Attenuator 11 is a calibrated attenuator adjustable in steps, which, by reducing the input voltage in a known fashion, permits the circuitry following it to be used with a wide range of pulse voltages without overdriving the circuitry. It also permits an effective adjustment of the threshold level at which the pulse width measurement is made; since by varying the voltage of the pulse with respect to a fixed threshold voltage, the same effect is achieved as if the threshold voltage itself were adjustable.

The input signal, after attenuation, is fed to threshold detector 12. This is a transistor amplifier stage biased off by a Zener diode so that it conducts only while the input voltage is in excess of the threshold voltage.

The length of the conducting period of this threshold detector therefore corresponds to the width of the pulse of the pulse at the threshold voltage level, and is used in the subsequent circuitry to obtain an indication of the pulse width.

The voltage waveform created by the periods of conduction and non-conduction of the threshold detector is fed to the input of wave shaper 13, which is a Schmitt trigger circuit. The Schmitt trigger wave shaper provides the waveform with sharper sides. The waveform resulting from wave shaper 13 is then used to energize switch 14. Switch 14 is so connected to wave shaper 13 that it will be energized during the same period of time that threshold detector 12 is conducting, i.e., switch 14 is energized during the time period in which the input pulse exceeds the voltage threshold.

When switch 14 is energized, upon the crossing of the threshold voltage by the input signal, it simultaneously turns on a plurality of timing circuits, here shown as three circuits 15, 16 and 17. Each of these timing circuits has a fixed timing cycle and all three timing cycles are different in length. We may assume here for purposes of illustration that the timing cycles corresponding to timing circuits 15, 16 and 17 have durations of one microsecond, two microseconds and three microseconds, respectively. An indicator is connected to the output of each timing circuit; indicators 18 and 19 and 20 corresponding to timing circuits 15, 16 and 17, respectively. The timing circuits are so arranged that when turned on by switch 14 the timing cycle commences to run, and continues to run as long as switch 14 remains energized. When any timing circuit completes its timing cycle, the corresponding indicator, which may conveniently be a visual indicator such as a light, is turned on and remains on. When switch 14 is deenergized upon the voltage of the pulse falling below the threshold level, all timing circuits are turned off and reset, and there will be no indication corresponding to those timing circuits in which the timing cycle has not been completed.

Thus, assuming the time values of the timing circuit cycles mentioned above, if indicators 18 and 19 are lit (assuming they are lights) and indicator 20 is not lit, then the observer knows that the transient pulse which has been recorded had a width of between two and three microseconds. While only three timing circuits and corresponding indicators are shown in the figures for purposes of convenience, obviously in a practical circuit there might be many more sets of timing circuits and indicators. The number of these circuits, and the time spacing between their corresponding timing cycles would of course depend upon the nature of the expected pulses and the required accuracy of pulse width determination.

Turning now to the detailed schematic diagram of FIG. 2, it will be seen that the signal at input 10 is applied across two terminals 22 and 23, with terminal 22 connected to the following circuitry and terminal 23 connected to ground. Terminal 22 is connected to arm 24 of a switch having eleven fixed contacts 25. Ten equal resistors 26 are connected in series and between contacts 25. Capacitors 27 are of equal value and are connected with one capacitor in parallel with each resistor 26 to provide a flat frequency response. The value of the capacitors 27 will of course be a function of the type of pulse expected and the value of the series resistors 26. This arrangement of the switch in connection with series connected resistors 26 provides the coarse, or large step, adjustment of the attenuator, and the number of resistors 26 which will be in the path of the input signal will of course be determined by the position of switch arm 24.

The signal proceeds downwardly through the chain of resistors 26 and into another group of series connected resistors 28, which group is connected at one end to the end of the series connected group of resistors 26 at junction point 29. Each of resistors 28 is connected between two fixed contacts 30 of a nine-position switch having a center arm 31. Center arm 31 is connected to junction point 29, so that by adjusting the position of arm 31, the desired number of resistors 28 may be by-passed by a zero impedance path. Resistors 28 are all equal in value and have a value considerably lower than resistors 26; the group of series connected resistor 28 therefore, in conjunction with the nine-position switch, forms the fine, or small increment, adjustment of attenuator 11. Capacitors 32, one each being in parallel with each resistor 28, provide for flat frequency response in a manner analogous to capacitors 27 described above.

From the bottom point 35 (as viewed in FIG. 2) of the group of series resistors 28, the signal is fed via lead 36 to the base of NPN transistor 37 in threshold detector stage 12. Resistor 38, connected between lead 36 and ground bus 39, is of the same value as resistors 28 and actually forms the last of the series connected string of resistors. It is necessary, of course, to provide a complete path for the input signal from terminal 22 to ground. Capacitor 41, connected between lead 36 and ground bus 39, provides frequency compensation. Diode 42, with its cathode connected to lead 36 and its anode connected to ground bus 39, protects transistor 37 against damage due to possible reversed voltage upon the base. Resistor 43, connected in lead 36 in series with the base of transistor 37, is the standard base current limiting resistor. The collector of transistor 37 is connected through resistor 44 to the positive voltage bus 45. Zener diode 46 and stabistor diode 47 are connected between the emitter of transistor 37 and ground bus 39 in series opposed relationship, with the cathode of Zener diode 46 being connected to the emitter and the cathode of stabistor diode 47 being connected to ground bus 39. A resistor 48 is connected between the emitter of transistor 37 and positive bus 45.

The series circuit comprising resistor 48, Zener diode 46 and stabistor diode 47 provides the threshold bias for threshold detector transistor 37. The emitter of transistor 37 is maintained at a potential comprising the sum of the Zener voltage of Zener diode 46 and the forward voltage drop of stabistor diode 47. The variation of the forward voltage drop of stabistor diode 47 with temperature provides temperature stabilization of the threshold detector circuit. With the emitter maintained at this potential, transistor 37 will normally remain non-conducting as long as the base voltage developed across resistor 38 remains less than the emitter voltage plus the fractional base-to-emitter voltage drop. As soon as the voltage at the base exceeds this value, transistor 37 will conduct; it will remain conducting as long as the base voltage exceeds this threshold value, and will cease conducting as soon as the base voltage drops below this value. The voltage value required on the base of transistor 38 for conduction is the voltage threshold level at which the pulse width is to be measured.

When transistor 37 is non-conducting, i.e., when the input voltage is below the threshold, the voltage at the collector of transistor 37 will be the DC supply voltage; whenever transistor 37 is conducting, i.e., whenever the pulse height exceeds the threshold value, the transistor conduction current flowing through collector resistor 44 will cause a voltage drop at the collector. The duration of this low voltage at the collector of transistor 37 will be equal to the period of time during which the incoming pulse exceeds the threshold value, and will thus provide, when appropriately processed by the succeeding circuitry, an indication of the pulse width at that threshold value.

The signal at the collector of transistor 37 is fed into the Schmitt trigger wave shaping circuit 13. This circuit is a conventional Schmitt trigger, comprising two PNP transistors 50 and 51 with their collectors connected through resistors 52 and 53, respectively, to ground bus 39 and their emitters joined together and connected through common emitter resistor 54 to positive bus 45. The base of transistor 51 is connected to the collector of transistor 50 through base resistor 55. Capacitor 56 connected in parallel with resistor 55 provides frequency compensation and enhances the speed of operation of the trigger circuit. The base of transistor 51 is also connected through resistor 57 to positive bus 45. Series connected resistors 52, 55 and 57 provide a voltage divider which biases the base of transistor 51 to a potential sufficiently negative with respect to its emitter to keep it normally in a conducting state.

The base of transistor 50 is connected through resistor 58 to the collector of transistor 37 in threshold detector stage 12. Capacitor 59 connected in parallel with resistor 58 provides frequency compensation and enhances the speed of operation of the Schmitt trigger circuit. The voltage drop across emitter resistor 54 due to normal conduction of transistor 51 maintains the emitter of transistor 50 at a potential slightly below that of positive bus 45. Since the potential coupled from the collector of transistor 37 through resistor 58 to the base of transistor 50 is essentially the potential of the DC bus when transistor 37 is non-conducting, transistor 50 will be biased to cut-off and will not conduct whenever transistor 37 is non-conducting, i.e., whenever the pulse height does not exceed the threshold value.

When the pulse exceeds the threshold value and transistor 37 conducts, dropping the voltage at its collector, the voltage at the base of transistor 50 will become sufficiently negative to overcome the bias upon its emitter, and transistor 50 will conduct. The conduction of transistor 50 will result in a much more positive voltage at its collector as a result of the voltage drop across resistor 52 due to the transistor conduction current, and this positive voltage will be coupled through the parallel combination of resistor 55 and capacitor 56 to the base of transistor 51, turning this transistor off. The increased voltage drop across resistor 54 due to conduction of transistor 50 will also aid in turning off transistor 51. When threshold detector transistor 37 ceases to conduct upon the recrossing of the threshold by the input signal, the Schmitt trigger assumes its initial state, with transistor 51 conducting and transistor 50 turned off. This conventional Schmitt trigger switching operation is well known. As a result of the Schmitt trigger operation, there will appear at the output of the circuit, the collector of transistor 51, a waveform having steep, sharply defined sides, being more negative while the pulse is in excess of the threshold voltage, and more positive at all other times.

The voltage waveform from wave shaping circuit 13 is used to control switch 14. Switch 14 comprises a PNP transistor 62 whose emitter is directly connected to positive bus 45 and whose collector is connected to the junction point 71 between the two series connected resistors 63 and 64 which form a voltage divider between ground bus 39 and positive bus 45. Resistor 65 is connected between positive bus 45 and the base of transistor 62. The base of transistor 62 is connected to the collector of transistor 51 in the Schmitt trigger through a network comprising the parallel combination of resistor 66 and capacitor 67 in series with Zener diode 68. Zener diode 68 is oriented to permit forward direction current flow from the collector of transistor 51 to the base of transistor 62.

Normally, that is, when the input signal is below the voltage threshold, switching transistor 62 will be non-conducting. This may be seen from an examination of the voltage appearing at the collector of Schmitt trigger transistor 51 which, when the transistor is in its normally conducting state, will be just slightly more negative than DC supply line 45, since emitter resistor 54 is substantially smaller than collector resistor 53, and the voltage drop across resistor 54 and across transistor 51 will be relatively small. However, since the voltage appearing at that point is more negative than DC supply bus 45, no current will be permitted to flow in the forward direction through Zener diode 68, and therefore the voltage appearing at the base of transistor 62 will be the DC supply voltage coupled through resistor 65. Since the emitter of transistor 62 is also at this voltage, the transistor will not conduct. It should be noted that while the voltage at the collector of transistor 51, with that transistor in its normal conducting state, will be slightly more negative than the voltage on supply bus 45, it will not be sufficiently negative to overcome the Zener bias of Zener diode 68 so as to cause current to flow through it. The three resistors, 53, 65 and 66, which are connected in series with Zener diode 68 provide the DC path necessary to establish the Zener bias of the diode.

When the input pulse exceeds the voltage threshold, transistor 51 no longer conducts and the voltage at its collector tends to drop to substantially ground potential. This is more than sufficient to overcome the Zener bias of Zener diode 68, whose other end is connected to DC supply bus 45. This causes conduction through the chain of resistors 53, 65 and 66, and the voltage drop across resistor 65 causes the base of transistor 62 to become negative with respect to its emitter, bringing that transistor into conduction.

The function of switching transistor 62 is to control the voltage level at junction point 71 between resistors 63 and 64, and thereby to control the operation of the subsequent timers. With transistor 62 in its normal non-conducting state, the voltage at junction point 71 will be some value between ground and the voltage upon the supply bus 45, with the particular value of voltage to be maintained there depending upon the nature and value of the timer components. When the input pulse exceeds the voltage threshold and transistor switch 62 is energized, it effectively shorts out resistor 63 and places junction point 71 substantially at the voltage of the DC supply bus 45, except for the small drop across the conducting transistor.

Since timing circuits 15, 16 and 17 are identical except for the values of circuit components providing different timing cycles, only timing circuit 15 will be described in detail. Timing circuit 15 has as its active element a double-base, or unijunction, transistor 72, with base 1 being connected to ground bus 39 through resistor 73 and base 2 being connected to positive bus 45 through resistor 74. A timing capacitor 75 connects the emitter to ground bus 39. The emitter is also connected to bus 76 leading from junction 71 through fixed resistor 77 and variable resistor 78 connected in series. The values of voltage divider resistors 63 and 64 are chosen so that, when switch 62 is non-conducting, the voltage appearing at junction 71, and coupled to the emitter of unijunction 72 through bus 76 and resistors 77 and 78, is insufficient to fire the unijunction. Capacitor 75, then, will normally remain charged to the voltage appearing at junction point 71. When, however, switch 62 is closed and the voltage at junction point 71 is suddenly raised to the voltage of DC supply bus 45, timing capacitor 75 will commence to charge from its initial voltage toward this new and higher voltage. The circuit is arranged so that the firing potential of unijunction transistor 72 is at some value between the normal voltage appearing at junction 71 and the voltage of the DC supply bus 45. The period of time required for capacitor 75 to charge from its initial level to this firing level comprises the timing cycle of timing circuit 15, and is controlled by the value of capacitor 75 and of the charge path resistors 77, 78 and 63. Resistor 78 is made variable to provide a small amount of adjustment in the timing cycle value. When timing capacitor 75 has charged to the unijunction firing level, the unijunction will enter its negative resistance state and the charge on capacitor 75 will be discharged through the emitter and base 1 of unijunction 72 and through resistor 73 to ground. This operation results in the well known positive voltage spike appearing across base 1 of resistor 73.

This positive voltage spike is used to energize indicator 18. Indicator 18 comprises an incandescent indicating lamp 81 series connected with silicon controlled rectifier (SCR) 82 between positive indicator supply bus 83 and ground bus 39. The control electrode of SCR 82 is connected through resistor 84 to base 1 of unijunction transistor 17 in timing circuit 15. Since normally only a small current flows through the base 1–base 2 circuit of unijunction transistor 72, the voltage drop across base 1 resistor 73 is small and consequently the voltage at base 1 is normally a very low positive voltage. This voltage, coupled through resistor 84 to the control element of SCR 82, is not positive enough to trigger the SCR into conduction, so that normally there is no current flowing through indicator lamp 81 and it is not lit. However, the high voltage spike appearing across resistor 73 when the unijunction transistor fires at the end of the timing cycle, and coupled through resistor 84 to the SCR, is sufficient to trigger SCR 82 into conduction. Current then flows in the series circuit and lights lamp 81. It is characteristic of an SCR that, once triggered into conduction, it remains conducting even though the triggering impulse is removed from the control element, until the voltage across the anode and cathode is destroyed or reversed. Thus SCR 82 will remain conducting and lamp 81 will remain lit after the termination of the unijunction spike.

If the width of the input pulse is substantially greater than the timing cycle of timing circuit 15 (which we have assumed as one microsecond) switch 62 will remain closed, supplying a high charging potential to the timing circuit, even after one timing cycle has been completed. Thus, it may happen that the timing capacitor 75 may have a chance to recharge a second time to the firing potential and, discharging through base 1 of unijunction 72, create a second voltage pulse across resistor 73. However, since SCR 82 remains conducting and lamp 81 remains lit after the first voltage pulse, any succeeding voltage pulses will have no effect on this circuit.

Since positive indicator supply bus 83 is connected to positive voltage supply bus 45 through normally closed reset switch 85, positive operating potential will be supplied to the indicators until such time as normally closed switch 85 is manually opened. When reset switch 85 is opened, after the pulse width indication has been read from the indicators, voltage is removed from indicator supply bus 83, causing SCR 82 and the corresponding SCR's in the other indicators to cease conduction, turning off all the indicator lights.

Indicators 19 and 20 are identical to indicator 18 described above, and are connected to their corresponding timing circuits 16 and 17, respectively, in an identical fashion.

It will be obvious, that while what has been described is a voltage sensitive circuit for measuring the width of positive-going pulses, it is well within the capability of one skilled in the art to use the principles provided herein to construct a similar circuit to measure the width of negative-going pulses, or to measure either positive- or negative-going current pulses rather than voltage pulses. Other variations and modifications of the circuit described herein as will suggest themselves to those skilled in the art are contemplated as being within the scope of this invention, which is defined solely in the claims.

What is claimed is:
1. An electrical device for measuring the duration of a transient signal, comprising:
   an input to receive a transient signal;
   level sensing means including a threshold detecting circuit with a preselected threshold, a wave forming circuit and an active semiconductor switching circuit;
   said threshold detecting circuit being connected to a source of biasing voltage which establishes its threshold and to said input to receive a transient signal therefrom, providing an output signal when the value of one parameter of the signal received from said input exceeds the preselected threshold thereof and not providing an output signal when the value of said one parameter is less than said preselected threshold;
   said wave forming circuit being a Schmitt trigger connected to said threshold circuit and in response to the output signal during its reception therefrom providing a formed switch actuating signal;
   said switching circuit being connected to said wave forming circuit, providing a first output signal when said forming circuit provides a switch actuating signal, and providing a second output signal in the absence of such a switch actuating signal;
   a plurality of timing circuits all connected to said switching circuit, operating when said switching circuit provides said first signal, and being rendered inoperative when said switching circuit provides said second signal;
   each of said timing circuits having a timing cycle when operating of fixed duration different from the fixed duration of the timing cycle of each of the other timing circuit, and providing a timing signal upon completion of its timing cycle; and
   indicating means connected to said plurality of timing circuits and responsive to the timing signals therefrom to indicate completion of the timing cycle of each timing circuit thereby indicating which of said plurality of timing circuits completed their respective timing cycles within the duration of said first output signal.

2. The electrical device in accordance with claim 1, wherein:
   said threshold detecting circuit includes a semiconductor device which is connected to said source of biasing voltage and is biased against conduction when the value of said one parameter is less than said preselected threshold, and which is rendered conductive over said bias when the value of said one parameter exceeds the preselected threshold;
   the bias of said semiconductor defining the preselected threshold;
   said level sensing means further comprises attenuating network means connected to said input and threshold detecting circuit for attenuating the transient signal from said input and providing the attenuated signal to said semiconductor device; and
   said attenuating network means having for varying the degree of attenuation of the signal provided to said semiconductor means to effectively vary the value of said preselected threshold relative to the value of the transient signal received at said input.

3. The electrical device in accordance with claim 1, wherein said threshold detecting circuit includes:
   a semiconductor device which is connected to said input and receives a signal therefrom; and
   an impedance being connected to said semi-conductor device and means for providing voltage being connected therebetween to provide said source of biasing voltage;
   said impedance establishing the threshold of said detecting circuit and the biasing voltage from said source blocking conduction by said semiconductor device when the value of said one parameter is less than the threshold, and said semiconductor being rendered conductive and providing a switch actuating signal when the value of said one parameter exceeds the value of said impedance.

4. The electrical device in accordance with claim 1, wherein said level sensing means further ecomprises:
   attenuating network means connected to said input and threshold detecting circuit for attenuating the transient signal from said input and providing the attenuated signal to said semiconductor device;
   said attenuating network means having for varying the degree of attenuation of the signal provided to said semiconductor means to effectively vary the value of said preselected threshold relative to the value of the transient signal received at said input.

5. The electrical device in accordance with claim 1, wherein:

said threshold detecting circuit includes a semiconductor which is connected to said input and receives a signal therefrom, an impedance being connected to said semiconductor device and means for providing voltage being connected therebetween to provide said source of biasing voltage;

said impedance establishing the threshold of said detecting circuit and the biasing voltage from said source blocking conduction by said semiconductor device when the value of said one parameter is less than the threshold, and said semiconductor being rendered conductive and providing a switch actuating signal when the value of said one parameter exceeds the value of said impedance;

said level sensing means further comprises attenuating network means connected to said input and threshold detecting circuit for providing the signal at said input to said semiconductor device; and said attenuating network means having for varying the degree of attenuation of the signal provided to said semiconductor means to effectively vary the value of said preselected threshold relative to the value of the transient signal received at said input.

6. The device in accordance with claim 4, wherein:

each of said timing circuits comprises an electrical energy storing device, means to supply electrical energy at a predetermined rate to said storing device, and an electronic device responsive to an electrical energy threshold;

said electronic and storing devices of each of said timing circuits being so connected that conduction by said electronic device is initiated when a predetermined level of electrical energy is stored in said storing device to provide a timing signal; and said level sensing means includes means to initiate the supplying of electrical energy to said storing device when the value of said one parameter exceeds said preselected threshold, and means to discharge said stored electrical energy from said storing device when the value of said one parameter no longer exceeds said preselected threshold.

7. The device in accordance with claim 6, wherein:

said electrical energy storing device is a capacitance;

said means to supply energy to said storing means comprising a charging potential source, and a charging impedance in series with said capacitance and charging potential source so connected that said capacitance tends to charge to said potential through said impedance; and said means to initiate the supplying of electrical energy and to discharge stored electrical energy comprising said switching circuit which is energized when said one parameter exceeds said preselected threshold and is de-energized when said one parameter does not exceed said pre-selected threshold;

said switching circuit being connected to control the charging potential so that when said switching means is energized the charging potential is in excess of said electrical energy threshold required for conduction by said electronic device, and when said switching circuit is de-energized the charging potential is at a value less than said electrical energy threshold.

References Cited

UNITED STATES PATENTS

| | | | |
|---|---|---|---|
| 2,877,412 | 3/1959 | Most | 324—68 |
| 2,976,487 | 3/1961 | Cohen | 324—68 |
| 3,127,595 | 3/1964 | Coyne | 324—68 |

RUDOLPH V. ROLINEC, *Primary Examiner.*

M. J. LYNCH, *Assistant Examiner.*